(12) United States Patent
Bucknell et al.

(10) Patent No.: US 10,703,419 B2
(45) Date of Patent: Jul. 7, 2020

(54) APPARATUS AND METHODS FOR JOINING PANELS

(71) Applicant: DIVERGENT TECHNOLOGIES, INC., Los Angeles, CA (US)

(72) Inventors: John Russell Bucknell, El Segundo, CA (US); Eahab Nagi El Naga, Topanga, CA (US); Antonio Bernerd Martinez, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/600,400

(22) Filed: May 19, 2017

(65) Prior Publication Data

US 2018/0334797 A1   Nov. 22, 2018

(51) Int. Cl.
*B62D 27/02* (2006.01)
*B62D 25/02* (2006.01)

(52) U.S. Cl.
CPC ......... *B62D 27/023* (2013.01); *B62D 27/026* (2013.01); *B62D 25/02* (2013.01); *E04F 2201/01* (2013.01)

(58) Field of Classification Search
CPC ... E04B 1/34321; B62D 27/023; B62D 25/02; B62D 27/02; E04F 2201/01
USPC .............................. 52/288.1, 287.1, 35, 273
See application file for complete search history.

(56) References Cited

U.S. PATENT DOCUMENTS

| | | | | | |
|---|---|---|---|---|---|
| 157,399 | A | * | 12/1874 | Holmes | B65D 9/32 114/88 |
| 183,160 | A | * | 10/1876 | Haughian | B23K 20/122 428/594 |
| 1,377,891 | A | * | 5/1921 | Knight | E04C 3/122 52/841 |
| 1,535,342 | A | * | 4/1925 | Ross | E21B 15/00 403/175 |
| 2,079,635 | A | * | 5/1937 | Sharp | B63B 3/68 114/71 |
| 2,994,905 | A | * | 8/1961 | Franker, Jr. | E04F 19/0495 16/16 |

(Continued)

FOREIGN PATENT DOCUMENTS

KR   10-0998210 B1   12/2010
WO   1996036455 A1   11/1996

(Continued)

OTHER PUBLICATIONS

US 9,202,136 B2, 12/2015, Schmidt et al. (withdrawn)
(Continued)

*Primary Examiner* — Joshua K Ihezie
(74) *Attorney, Agent, or Firm* — Arent Fox LLP

(57) ABSTRACT

Apparatus and methods for joining panels are presented. Panels may be commercial off the shelf (COTS) panels and/or additively manufactured panels; and panels can be joined using an additively manufactured interconnect unit. Notches and protrusions can be formed in the panels and in the interconnect unit to facilitate the connection of the panels with the interconnect unit. In another approach a ribbed triangular prism can be manufactured using three dimensional (3D) printing. The panels can then be joined by inserting the ribbed triangular prism between the panels and by using an adhesive for bonding.

18 Claims, 5 Drawing Sheets

(56) References Cited

U.S. PATENT DOCUMENTS

| | | | | |
|---|---|---|---|---|
| 3,222,837 A | * | 12/1965 | Daley | A47K 3/008 52/250 |
| 3,876,270 A | * | 4/1975 | White | A47B 88/941 312/348.1 |
| 3,989,397 A | * | 11/1976 | Baker | F16B 12/02 403/205 |
| 4,027,452 A | * | 6/1977 | Donnell | E04F 19/0436 160/327 |
| 4,167,353 A | * | 9/1979 | Gebhardt | F16B 12/50 220/684 |
| 4,261,148 A | * | 4/1981 | Scott | A47B 47/0041 217/65 |
| 4,437,278 A | * | 3/1984 | Thomas, Jr. | E04B 2/7425 52/239 |
| 4,507,815 A | * | 4/1985 | Danko | A47C 19/005 403/205 |
| 4,509,806 A | * | 4/1985 | Dudouyt | F16B 12/02 108/180 |
| 4,712,942 A | * | 12/1987 | Brown | F16B 5/00 403/174 |
| 4,719,733 A | * | 1/1988 | Seles | A47K 3/008 52/287.1 |
| 4,829,730 A | * | 5/1989 | Zeilinger | A47K 3/001 52/287.1 |
| 4,840,440 A | * | 6/1989 | Dieter | F16B 12/46 217/65 |
| 4,973,187 A | * | 11/1990 | Sauder | E06B 3/9682 403/205 |
| 5,203,226 A | | 4/1993 | Hongou et al. | |
| 5,404,684 A | * | 4/1995 | Schwendeman | A47B 47/0041 52/282.2 |
| 5,466,086 A | * | 11/1995 | Goto | E04B 1/2604 403/267 |
| 5,501,044 A | * | 3/1996 | Janesky | E04B 1/7023 404/4 |
| 5,560,174 A | * | 10/1996 | Goto | F16B 11/006 403/267 |
| 5,575,129 A | * | 11/1996 | Goto | E04B 1/1903 403/267 |
| 5,742,385 A | | 4/1998 | Champa | |
| 5,990,444 A | | 11/1999 | Costin | |
| 6,009,586 A | * | 1/2000 | Hawkes | E01D 15/133 14/4 |
| 6,010,155 A | | 1/2000 | Rinehart | |
| 6,096,249 A | | 8/2000 | Yamaguchi | |
| 6,140,602 A | | 10/2000 | Costin | |
| 6,250,533 B1 | | 6/2001 | Otterbein et al. | |
| 6,252,196 B1 | | 6/2001 | Costin et al. | |
| 6,306,239 B1 | * | 10/2001 | Breuer | B29C 70/30 156/245 |
| 6,318,642 B1 | | 11/2001 | Goenka et al. | |
| 6,365,057 B1 | | 4/2002 | Whitehurst et al. | |
| 6,391,251 B1 | | 5/2002 | Keicher et al. | |
| 6,409,930 B1 | | 6/2002 | Whitehurst et al. | |
| 6,468,439 B1 | | 10/2002 | Whitehurst et al. | |
| 6,554,345 B2 | | 4/2003 | Jonsson | |
| 6,585,151 B1 | | 7/2003 | Ghosh | |
| 6,585,448 B2 | * | 7/2003 | Grossman | F16B 12/46 403/403 |
| 6,644,721 B1 | | 11/2003 | Miskech et al. | |
| 6,811,744 B2 | | 11/2004 | Keicher et al. | |
| 6,835,261 B2 | * | 12/2004 | Schmidt | B29C 65/5071 156/92 |
| 6,866,497 B2 | | 3/2005 | Saiki | |
| 6,919,035 B1 | | 7/2005 | Clough | |
| 6,926,970 B2 | | 8/2005 | James et al. | |
| 6,948,287 B2 | * | 9/2005 | Korn | E04B 1/68 277/510 |
| 7,152,292 B2 | | 12/2006 | Hohmann et al. | |
| 7,322,770 B2 | * | 1/2008 | Frank | A47F 3/004 403/253 |
| 7,344,186 B1 | | 3/2008 | Hausler et al. | |
| 7,371,304 B2 | * | 5/2008 | Christman | B29C 65/00 156/293 |
| 7,393,488 B2 | * | 7/2008 | Grose | B29C 65/527 264/254 |
| 7,500,373 B2 | | 3/2009 | Quell | |
| 7,586,062 B2 | | 9/2009 | Heberer | |
| 7,637,134 B2 | | 12/2009 | Burzlaff et al. | |
| 7,703,244 B2 | * | 4/2010 | Suzuki | E04B 1/24 403/169 |
| 7,710,347 B2 | | 5/2010 | Gentilman et al. | |
| 7,716,802 B2 | | 5/2010 | Stern et al. | |
| 7,745,293 B2 | | 6/2010 | Yamazaki et al. | |
| 7,766,123 B2 | | 8/2010 | Sakurai et al. | |
| 7,852,388 B2 | | 12/2010 | Shimizu et al. | |
| 7,897,095 B2 | * | 3/2011 | Raeckers | B29C 65/5042 156/242 |
| 7,908,922 B2 | | 3/2011 | Zarabadi et al. | |
| 7,951,324 B2 | | 5/2011 | Naruse et al. | |
| 8,094,036 B2 | | 1/2012 | Heberer | |
| 8,163,077 B2 | | 4/2012 | Eron et al. | |
| 8,171,685 B2 | * | 5/2012 | Harrison | E04F 19/022 52/254 |
| 8,286,236 B2 | | 10/2012 | Jung et al. | |
| 8,289,352 B2 | | 10/2012 | Vartanian et al. | |
| 8,297,096 B2 | | 10/2012 | Mizumura et al. | |
| 8,302,363 B1 | * | 11/2012 | Johnson | E04H 6/025 52/127.4 |
| 8,354,170 B1 | | 1/2013 | Henry et al. | |
| 8,383,028 B2 | | 2/2013 | Lyons | |
| 8,397,463 B2 | * | 3/2013 | Allred, III | E04C 3/08 403/170 |
| 8,408,036 B2 | | 4/2013 | Reith et al. | |
| 8,429,754 B2 | | 4/2013 | Jung et al. | |
| 8,437,513 B1 | | 5/2013 | Derakhshani et al. | |
| 8,444,903 B2 | | 5/2013 | Lyons et al. | |
| 8,452,073 B2 | | 5/2013 | Taminger et al. | |
| 8,484,931 B2 | * | 7/2013 | Gleeson | E04F 13/0864 52/489.1 |
| 8,599,301 B2 | | 12/2013 | Dowski, Jr. et al. | |
| 8,606,540 B2 | | 12/2013 | Haisty et al. | |
| 8,610,761 B2 | | 12/2013 | Haisty et al. | |
| 8,631,996 B2 | | 1/2014 | Quell et al. | |
| 8,675,925 B2 | | 3/2014 | Derakhshani et al. | |
| 8,678,060 B2 | | 3/2014 | Dietz et al. | |
| 8,686,314 B2 | | 4/2014 | Schneegans et al. | |
| 8,686,997 B2 | | 4/2014 | Radet et al. | |
| 8,694,284 B2 | | 4/2014 | Berard | |
| 8,720,876 B2 | | 5/2014 | Reith et al. | |
| 8,733,033 B2 | * | 5/2014 | Schwartau | E04B 1/14 52/169.11 |
| 8,752,166 B2 | | 6/2014 | Jung et al. | |
| 8,755,923 B2 | | 6/2014 | Farahani et al. | |
| 8,787,628 B1 | | 7/2014 | Derakhshani et al. | |
| 8,818,771 B2 | | 8/2014 | Gielis et al. | |
| 8,873,238 B2 | | 10/2014 | Wilkins | |
| 8,925,278 B2 | * | 1/2015 | Sugihara | E04B 1/58 52/167.3 |
| 8,959,856 B2 | * | 2/2015 | Volkner | E04B 1/24 52/256 |
| 8,978,535 B2 | | 3/2015 | Ortiz et al. | |
| 9,006,605 B2 | | 4/2015 | Schneegans et al. | |
| 9,071,436 B2 | | 6/2015 | Jung et al. | |
| 9,101,979 B2 | | 8/2015 | Hofmann et al. | |
| 9,104,921 B2 | | 8/2015 | Derakhshani et al. | |
| 9,126,365 B1 | | 9/2015 | Mark et al. | |
| 9,128,476 B2 | | 9/2015 | Jung et al. | |
| 9,138,924 B2 | | 9/2015 | Yen | |
| 9,149,988 B2 | | 10/2015 | Mark et al. | |
| 9,151,037 B2 | * | 10/2015 | Hedler | E04B 1/34321 |
| 9,156,205 B2 | | 10/2015 | Mark et al. | |
| 9,186,848 B2 | | 11/2015 | Mark et al. | |
| 9,244,986 B2 | | 1/2016 | Karmarkar | |
| 9,248,611 B2 | | 2/2016 | Divine et al. | |
| 9,254,535 B2 | | 2/2016 | Buller et al. | |
| 9,266,566 B2 | | 2/2016 | Kim | |
| 9,269,022 B2 | | 2/2016 | Rhoads et al. | |
| 9,327,452 B2 | | 5/2016 | Mark et al. | |
| 9,329,020 B1 | | 5/2016 | Napoletano | |

(56) References Cited

U.S. PATENT DOCUMENTS

| | | |
|---|---|---|
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaalhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |

(56) References Cited

U.S. PATENT DOCUMENTS

| | | | |
|---|---|---|---|
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2003/0056453 A1* | 3/2003 | Young .................. E04F 19/022 |
| | | 52/255 |
| 2003/0163962 A1* | 9/2003 | Jefferson .................. H02G 3/30 |
| | | 52/220.1 |
| 2004/0040235 A1* | 3/2004 | Kurtz .................. E04F 19/0468 |
| | | 52/288.1 |
| 2006/0108783 A1 | 5/2006 | Ni et al. |
| 2006/0113450 A1 | 6/2006 | Kilwin et al. |
| 2008/0245006 A1* | 10/2008 | Rachak .................. E04F 19/04 |
| | | 52/287.1 |
| 2009/0081400 A1 | 3/2009 | Wolf et al. |
| 2010/0162646 A1* | 7/2010 | Grice .................. H02G 3/0437 |
| | | 52/287.1 |
| 2013/0309005 A1* | 11/2013 | Barrett .................. H02B 1/301 |
| | | 403/361 |
| 2014/0277669 A1 | 9/2014 | Nardi et al. |
| 2014/0301775 A1 | 10/2014 | Erlich et al. |
| 2015/0014484 A1 | 1/2015 | Zeon et al. |
| 2017/0050677 A1* | 2/2017 | Czinger .................. B62D 21/17 |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |

(56) References Cited

FOREIGN PATENT DOCUMENTS

| | | |
|---|---|---|
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated May 9, 2018, regarding PCT/US2018/016481.

* cited by examiner

APPARATUS AND METHODS FOR JOINING PANELS

BACKGROUND

Field

The present disclosure relates generally to techniques for joining panels to panels, and more specifically to joining panels using additively manufactured parts and techniques.

Background

Recently three-dimensional (3D) printing, also referred to as additive manufacturing, has presented new opportunities to efficiently build automobiles and other transport structures such as airplanes, boats, motorcycles, and the like. Applying additive manufacturing processes to industries that produce these products has proven to produce a structurally more efficient transport structure. An automobile produced using 3D printed components can be made stronger, lighter, and consequently, more fuel efficient. Advantageously, 3D printing, as compared to traditional manufacturing processes, does not significantly contribute to the burning of fossil fuels; therefore, the 3D printing of parts for automobiles can be classified as a green technology.

Different composite materials may be used that were not previously available in traditional manufacturing processes. For a variety of reasons, however, conventional techniques for joining parts, such as welding, may not be a viable alternative for use with some of these new materials. Accordingly, there is a need to discover and develop new ways to join composite panels using additively manufactured parts and techniques.

SUMMARY

Several aspects of techniques for joining panels will be described more fully hereinafter with reference to three-dimensional (3D) printing techniques.

In one aspect an apparatus comprises a first panel and a second panel and an interconnect. Each of the first and second panels has a panel feature. The interconnect comprises a first interconnect feature and a second interconnect feature. The first interconnect feature is engaged with the panel feature for the first panel, and the second interconnect feature is engaged with the panel feature for the second panel.

The interconnect can be additively manufactured. Also, each of the panel features can comprise a notch and each of the first and the second interconnect features can comprise a projection. Alternatively, each of the panel features can comprise a projection and each of the first and the second interconnect features can comprise a notch. At least one of the first and second panels can be additively manufactured, and at least one of the first and second panels can be a honeycomb sandwich panel. Also, the interconnect can comprise fluid transport tubing.

The apparatus can further comprise tubing coupled to the interconnect for adhesive injection between the each of the panel features and its corresponding one of the first and the second interconnect features.

In another aspect an apparatus comprises a first panel, a second panel, and an additively manufactured interconnect. The additively manufactured interconnect comprises an insert having a first surface attached to the first panel and a second surface attached to the second panel.

The insert can be hollow and include internal ribbing. The insert can comprise a triangular prism; also, the insert can comprise a load bearing structure. At least one of the first and second panels can be additively manufactured. Also, at least one of the first and second panels can be a honeycomb sandwich panel.

In another aspect a method of joining panels comprises preparing a first panel and a second panel for joining and attaching a first surface of the first panel to a first surface of the second panel. The first surface of the first panel is attached to the first surface of the second panel using a first additively manufactured interconnect unit.

The attaching step can comprise inserting a projection of the first surface of the first panel into a notch of the first additively manufactured interconnect unit. Alternatively, the attaching step can comprise inserting a projection of the first additively manufactured interconnect unit into a notch of the first surface of the first panel.

Additionally, the first additively manufactured interconnect unit can comprise fluid transport tubing. At least one of the first and second panels can be additively manufactured, and at least one of the first and second panels can be a honeycomb sandwich panel.

The method can further comprise attaching a second surface of the first panel to a second surface of the second panel using a second additively manufactured interconnect unit. Also, the second additively manufactured interconnect unit can comprise fluid transport tubing.

In another aspect a method of joining panels using three-dimensional (3D) printing comprises preparing a first panel and a second panel for joining, printing an interconnect, and attaching the interconnect to the first panel and the second panel.

At least one of the first and second panels can be additively manufactured, and at least one of the first and second panels can comprise a honeycomb sandwich panel. Also, the attaching step can comprise using an adhesive.

The interconnect can comprise an insert, and the insert can be a triangular prism insert. Also, the insert can be hollow and can comprise internal ribbing.

Different composite materials may be used that were not previously available in traditional manufacturing processes. It will be understood that other aspects of joining panels will become readily apparent to those skilled in the art from the following detailed description, wherein it is shown and described only several embodiments by way of illustration. As will be appreciated by those skilled in the art, the joining of panels using additively manufactured interconnects and interconnect units can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for joining panels will now be presented in the detailed description by way of example, and not by way of limitation, in the accompanying drawings, wherein.

DETAILED DESCRIPTION

Figure 1:
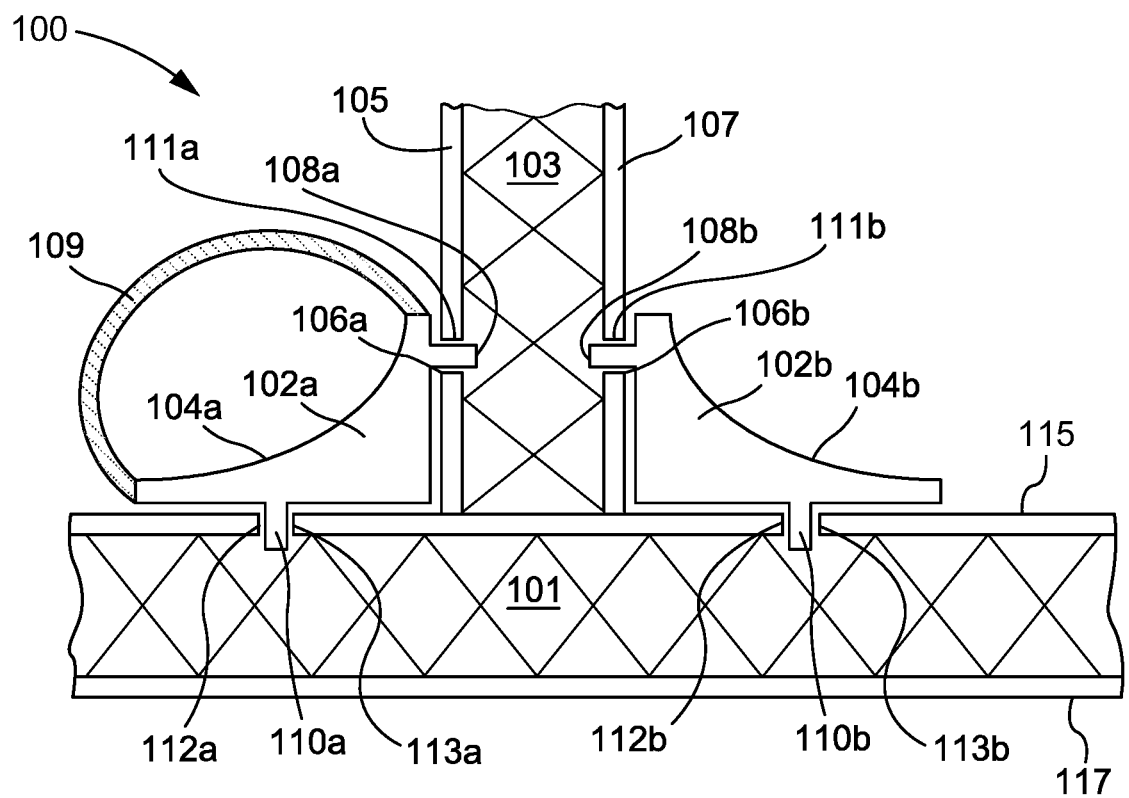
FIG. 1 illustrates a top cross-sectional view of panels joined together using interconnect units.

The detailed description set forth below in connection with the drawings is intended to provide a description of exemplary embodiments of joining panels using additively manufacturing techniques, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting additively manufactured parts and/or commercial off the shelf (COTS) components. Additively manufactured parts are printed three-dimensional (3D) parts that are printed by adding layer upon layer of a material based on a preprogrammed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like without departing from the scope of the invention.

By utilizing additive manufacturing techniques it becomes simpler to join different parts and/or components in the manufacturing process by applying an adhesive. Additive manufacturing provides the ability to create complex structures within a part. For example, a part such as a node may be printed with a port that enables the ability to secure two parts by injecting an adhesive rather than welding two parts together, as is traditionally done in manufacturing complex products. Alternatively, some components may be connected using a brazing slurry, a thermoplastic, or a thermoset, any of which can be used interchangeably in place of an adhesive.

As described above, these are non-traditional approaches to connecting additively manufactured components, such as panels, and it can be advantageous to develop new ways to join components together during the manufacturing process.

Apparatus and methods for joining panels are presented herein. Panels can be printed and joined together. In one approach panels can be joined using an additively manufactured interconnect unit, which can also be referred to as "interconnect". Notches and protrusions can be formed in the panels and/or in the interconnect unit (interconnect) to facilitate their alignment and connection. In another approach a ribbed triangular prism can be manufactured using three dimensional (3D) printing. Ribs can be strategically placed to create critical load paths, and the panels can then be joined by inserting the ribbed triangular prism between the panels.

FIG. 1 illustrates a top cross-sectional view 100 of panels 101 and 103 joined together using interconnect units 102a and 102b. The panel 101 has a first notch delineated by the edges 112a and 113a and a second notch delineated by the edges 112b and 113b. The panel 103 has a first notch delineated by the edges 106a and 111a and a second notch delineated by the edges 106b and 111b. The panels 101 and 103 may be additively manufactured, in which case the notches can be formed in the panels 101 and 103 during the additive manufacturing process. Alternatively, the panels 101 and 103 may be commercial off the shelf (COTS) panels, in which case the notches can be drilled into the panels 101 and 103.

The panels 101 and 103 can be connected together by using the interconnect units 102a and 102b. As shown in FIG. 1, the interconnect unit 102a has protrusions 108a and 110a which can be inserted into the first notches of panels 101 and 103. Similarly, the interconnect unit 102b has protrusions 108b and 110b which can be inserted into the second notches of panels 101 and 103.

The interconnect units 102a and 102b can be used to intermittently locate and align the panels 101 and 103 prior to adhering them together. Additionally, the panels 101 and 103 and the interconnect units 102a and 102b can be aligned to within a tolerance determined, at least in part, by the additive manufacturing process. For instance, when the panels 101 and 103 are additively manufactured, a position-based tolerance can be defined by a user or programmer prior to and/or during the 3D printing of panels 101 and 103 and of interconnect units 102a and 102b. Alternatively, if the panels 101 and 103 are COTS panels, then a position-based tolerance can be defined, at least in part, when notches are drilled into the panels 101 and 103.

Also as shown in FIG. 1, the interconnect units 102a and 102b can be manufactured to support additional components. For instance, the interconnect 102a includes a fluid transport tubing 109 which can be used to transport fluid such as hydraulic fluid. Hydraulic fluid can, in turn, be used to drive actuators located within a vehicle. In addition to carrying hydraulic fluid, the transport tubing 109 can also be used to transport lubricants or oil. In other embodiments the fluid transport tubing 109 can be used to transport air and to operate as an air duct.

The panels 101 and 103 can be additively manufactured panels and/or commercial off the shelf (COTS) panels. One or both of the panels 101 and 103 can be in the form of honeycomb sandwich panels. For instance, as shown in FIG. 1, panel 101 can have a honeycomb material sandwiched between an outer sheet 115 and an outer sheet 117. Similarly, panel 103 can have a honeycomb material sandwiched between an outer sheet 105 and an outer sheet 107. The honeycomb structures can advantageously enhance panel strength while reducing the requisite amount of materials, weight and cost. Additionally, the honeycomb structures can be manufactured using three-dimensional (3D) printing.

Although the panels 101 and 103 are shown as having a honeycomb sandwich structure, other structures are possible. For instance, panel 101 and/or panel 103 can be formed into plain sheets, into sandwiched sheets with alternative internal structures such as a lattice structure, and/or into any other suitable 2D or 3D structures. Alternatively or additionally, panels 101 and 103 may be formed to contain any suitable internal structures, such as a honeycomb, foam, or lattice structure.

Although the panels 101 and 103 are shown as having first and second notches while the interconnect units 102a and 102b have protrusions 108a-b, 110a-b, other embodiments are possible. For instance, one or both panels could be manufactured to have notches and one or both interconnect units could be manufactured to have protrusions or combinations of protrusions and notches.

Also, although the panels 101 and 103 are shown as having only two notches, each panel can have fewer or greater than two notches or protrusions. And similarly, the interconnect units 102a and 102b can also be manufactured to have fewer or greater than two protrusions and/or notches.

Also shown from the top-perspective view of FIG. 1, the interconnect units 102a and 102b are manufactured to have concave outer surfaces 104a and 104b, respectively. As one of ordinary skill in the art can appreciate, other interconnect structures can be fabricated or printed with a variety of shapes, including but not limited to convex, linear, and semi-circular geometries, and the like.

Additionally, a variety of notches and protrusions of various geometries may be formed on the interconnect units 102a and 102b and/or on the panels 101 and 103. For instance, notches and protrusions can have rectangular, round, square, oval, and/or complex geometric shapes.

Figure 2:
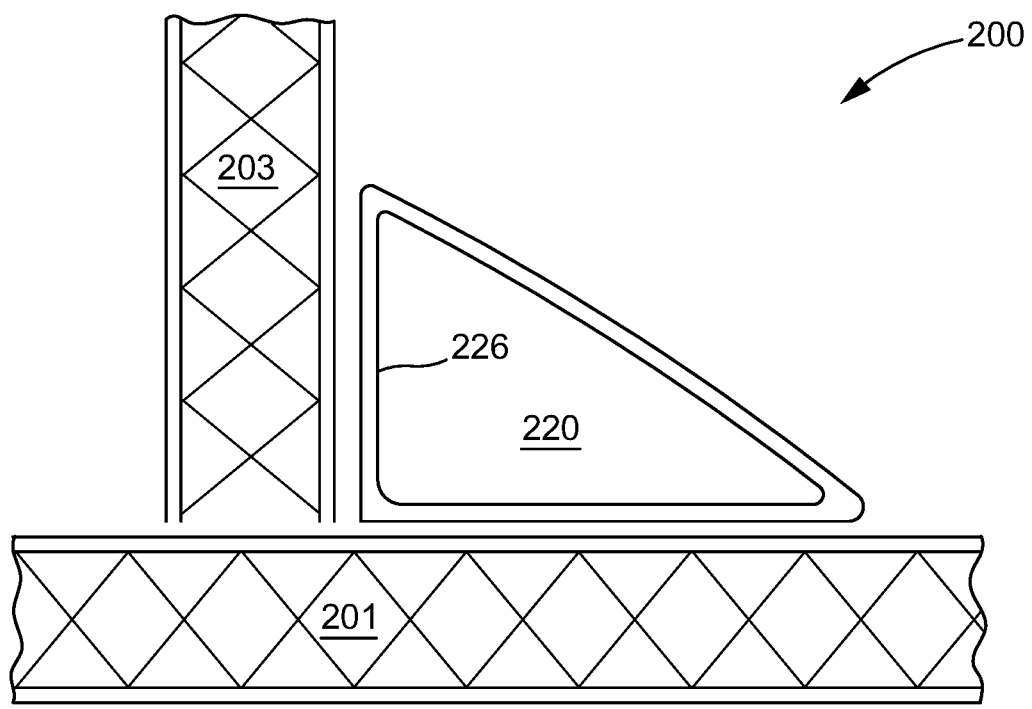
FIG. 2 illustrates a top cross-sectional view of panels joined together using a triangular prism.

FIG. 2 illustrates a top cross-sectional view 200 of panels 201 and 203 joined together using a triangular prism 220, which may also be referred to as a triangular prism insert. The panels 201 and 203 can be similar to the panels 101 and 103 of FIG. 1 except panels 201 and 203 may be manufactured without notches or protrusions. Instead, the triangular prism 220 can be attached to surfaces of both panels 201 and 203 as shown in FIG. 2. For instance, a side 226 of the triangular prism 220 can be attached with an adhesive or bonding agent to the surface of panel 203 while the other side can be attached with an adhesive or bonding agent to the surface of panel 201. Examples of a bonding agent may include a brazing slurry, a thermoplastic, or a thermoset.

Using 3D printing, the triangular prism 220 can be additively manufactured to comprise internal ribs. The internal ribs can be positioned at high stress or bond points to improve and enhance the strength of the joined panels 201 and 203. Additionally, the triangular prism 220 can be hollow. Having a hollow interior with internal ribs, the triangular prism 220 can advantageously offer a lightweight solution to providing strong support at high stress or bond points.

Figure 3:
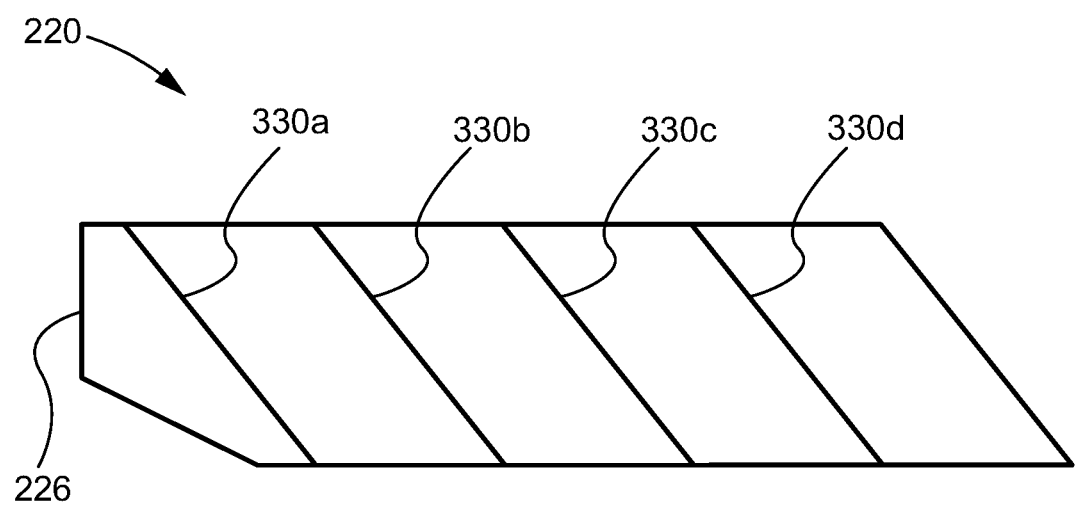
FIG. 3 illustrates a side perspective view of the triangular prism of FIG. 2.

FIG. 3 illustrates a side perspective view of the triangular prism 220 of FIG. 2. For perspective, the side 226 is shown towards the back of the drawing. Using 3D printing, the triangular prism 220 can be advantageously layered to have a hollow interior with ribs 330a-d.

Although FIGS. 2 and 3 show an embodiment where panels are joined using a triangular prism 220, other inserts, interconnects, and/or load bearing structures, can be used instead of a triangular prism. For instance, instead of a triangular prism 220, an insert may be a load bearing structure having a curved portion or side which is not linear, but instead, curvilinear. The load bearing structure may also have additional features, such as curved contours, which allow improved support and/or optimization.

Figure 4:
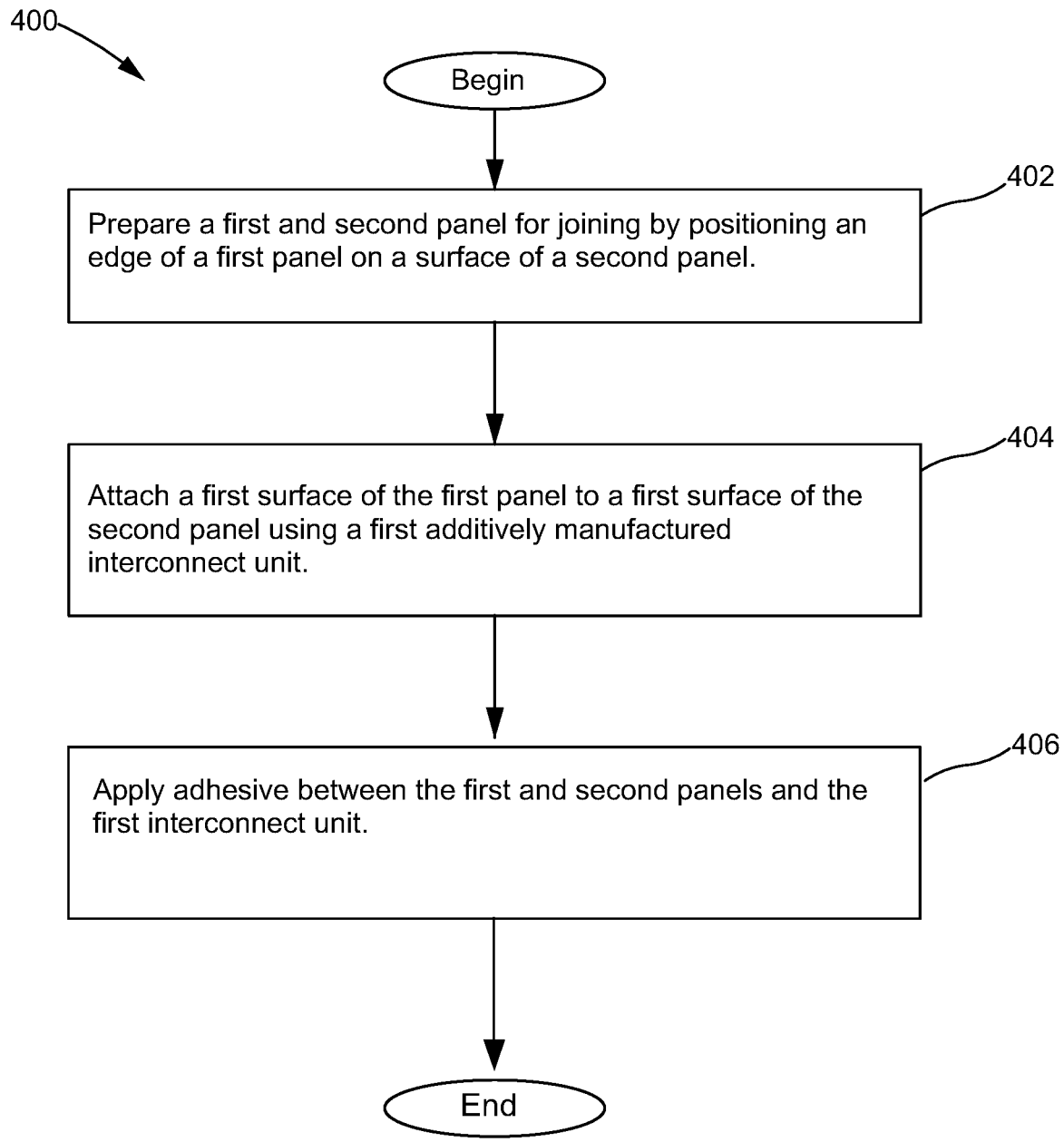
FIG. 4 conceptually illustrates a process for joining a first panel and a second panel with an interconnect unit.

FIG. 4 conceptually illustrates a process 400 for joining a first panel and a second panel with an interconnect unit. The process step 402 may correspond to the manufacturing of the first and second panels. For instance, process step 402 can represent the 3D printing of panels 101 and 103 of FIG. 1 with notches or protrusions. Alternatively, the process step 402 may correspond to using commercial off the shelf (COTS) panels. Also, the process step 402 may represent the preparation of panels which do not have notches of protrusions. In this case, there may be a need to prepare the first and second panels by drilling notches.

Next, process step 404 may correspond to the alignment and attachment of a first surface of the first panel to a first surface of the second panel using a first additively manufactured interconnect unit. With reference to FIG. 1, the first panel can be panel 101, the second panel can be panel 103, and the first additively manufactured interconnect unit can be interconnect unit 102a. The first surface of the first panel can correspond to the surface of side 115 of panel 101; and the first surface of the second panel can correspond to the side 105 of panel 103.

Figure 5:
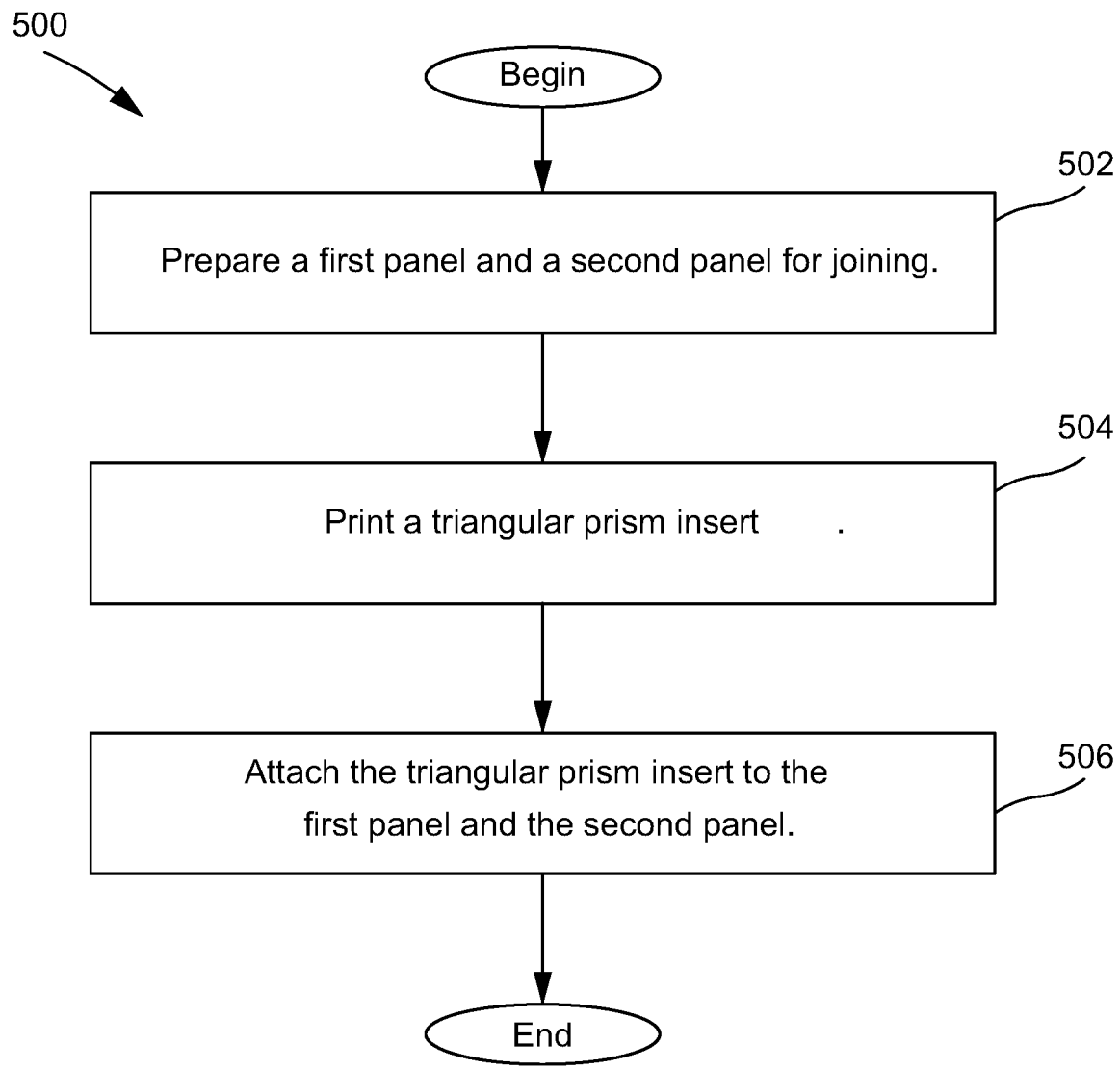
FIG. 5 conceptually illustrates a process for joining a first panel and a second panel with a triangular prism insert.

FIG. 5 conceptually illustrates a process 500 for joining a first panel and a second panel with a triangular prism insert. The process step 502 may correspond to the preparing and/or manufacturing of the first and second panels. For instance, process step 502 can represent the 3D printing of panels 201 and 203 of FIG. 2. Alternatively, the process step 502 may correspond to using commercial off the shelf (COTS) panels for panels 201 and 203 of FIG. 2.

Next, process step 504 may represent the 3D printing of the triangular prism 220 of FIGS. 2 and 3. During process step 504 the triangular prism 220 may be additively manufactured to be hollow with ribbing, where the ribbing can correspond to ribs 330a-d.

Next process step 506 can correspond to the attachment of the triangular prism insert to the first panel and the second panel. The triangular prism insert can refer to the triangular prism 220 of FIGS. 2 and 3. The first panel and the second panel can correspond to the panels 201 and 203, respectively.

Although FIG. 5 shows an embodiment of a process 500 for joining a first panel and a second panel with a triangular prism insert, the process can also apply to joining a first panel and a second panel with an interconnect. For instance, process steps 504 and 506 can refer more generally to an interconnect, instead of a triangular prism insert, where the interconnect can comprise an insert and/or can be a load bearing structure as described above with respect to FIGS. 2 and 3.

Panel design may incorporate one or more factors such as materials, structure, design, and/or connecting features. The sheets may be made of carbon fibers to reduce chassis weight. The sheets may alternatively or additionally be made from metals, such as aluminum, steel, iron, nickel, titanium, copper, brass, silver, or any combination or alloy thereof. Advantages of using metal materials may include improving puncture resistance. The panels may have various structures, such as plain sheets, honeycomb, sandwiched sheets including internal structures such as honeycomb structure, lattice structure, and/or any other suitable 2D or 3D structures as discussed herein. Panels may be formed by honeycomb structures to allow enhanced strength by using reduced amount of materials, weight and cost. Alternatively or additionally, panels may be formed by sandwiching honeycomb structures between sheets. Alternatively or additionally, panels may be formed to contain any suitable internal structures, such as lattice structure described further herein. The panel may include various internal structures such as honeycomb, foam, or lattice structure. The variety of internal structures may be fabricated using 3D printing. In some instances, the panel may be pre-drilled to accelerate riveting to shear panels. Alternatively, adhesives may be applied to the interface of the extrusion and the panel skin to form a connection.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing panels and interconnects (interconnect units). Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
    first and second panels having first and second respective surfaces, the first panel having an edge, the edge positioned against a flat portion of the second surface of the second panel, each of the first and second panels having a panel feature at the respective first and second surfaces; and
    an interconnect comprising a first interconnect feature engaged with the panel feature for the first panel at the first surface and a second interconnect feature engaged with the panel feature for the second panel at the second surface;
    wherein the interconnect includes a tubing bounded by a concave outer surface of the interconnect.

2. The apparatus of claim 1, wherein the interconnect is additively manufactured.

3. The apparatus of claim 1, wherein the each of the panel features comprises a notch and each of the first and the second interconnect features comprises a projection.

4. The apparatus of claim 1, wherein the each of the panel features comprises a projection and each of the first and the second interconnect features comprises a notch.

5. The apparatus of claim 1, wherein at least one of the first and second panels is additively manufactured.

6. The apparatus of claim 1, wherein at least one of the first and second panels is a honeycomb sandwich panel.

7. An apparatus, comprising:
    first and second panels having first and second respective surfaces, the first panel having an edge positioned against a flat portion of the second surface of the second panel; and
    an additively manufactured interconnect comprising an insert having a first side attached to the first surface of the first panel and a second side attached to the second surface of the second panel;
    wherein the additively manufactured interconnect includes a tubing bounded by a curved portion of the insert.

8. The apparatus of claim 7, wherein the insert comprises a triangular prism.

9. The apparatus of claim 7, wherein the insert comprises a load bearing structure.

10. The apparatus of claim 7, wherein at least one of the first and second panels is additively manufactured.

11. The apparatus of claim 7, wherein at least one of the first and second panels is a honeycomb sandwich panel.

12. A method of joining panels, the method comprising:
    preparing a first panel and a second panel for joining with a first additively manufactured interconnect unit, wherein the first and second panels include first and second respective surfaces and an edge of the first panel is positioned against a flat portion of the second surface of the second panel; and
    attaching the first surface of the first panel to the second surface of the second panel using the first additively manufactured interconnect unit, the first additively manufactured interconnect unit including a tubing bounded by a curved portion of the first additively manufactured interconnect unit.

13. The method of claim 12, wherein the attaching step comprises inserting a projection of the first surface of the first panel into a notch of the first additively manufactured interconnect unit.

14. The method of claim 12, wherein the attaching step comprises inserting a projection of the first additively manufactured interconnect unit into a notch of the first surface of the first panel.

15. The method of claim 12, wherein at least one of the first and second panels is additively manufactured.

16. The method of claim 12, wherein at least one of the first and second panels is a honeycomb sandwich panel.

17. The method of claim 12, further comprising:
    attaching a second surface of the first panel to the second surface of the second panel using a second additively manufactured interconnect unit.

18. The method of claim 17, wherein the second additively manufactured interconnect unit comprises fluid transport tubing.

* * * * *